(12) United States Patent
Garraway et al.

(10) Patent No.: US 10,221,755 B2
(45) Date of Patent: Mar. 5, 2019

(54) THERMAL CONTROLLER WITH AUTOMOTIVE APPLICATIONS

(71) Applicants: Marcus A. Garraway, Phoenix, AZ (US); John B. Evans, Prescott Valley, AZ (US); Charles J Navarro, Cerritos, CA (US); Mark E. Innocenzi, Thousand Oaks, CA (US)

(72) Inventors: Marcus A. Garraway, Phoenix, AZ (US); John B. Evans, Prescott Valley, AZ (US); Charles J Navarro, Cerritos, CA (US); Mark E. Innocenzi, Thousand Oaks, CA (US)

( * ) Notice: Subject to any disclaimer, the term of this patent is extended or adjusted under 35 U.S.C. 154(b) by 0 days.

(21) Appl. No.: 14/583,645

(22) Filed: Dec. 27, 2014

(65) Prior Publication Data

US 2016/0186646 A1    Jun. 30, 2016

(51) Int. Cl.
*F01P 7/16*  (2006.01)
*G05D 23/19*  (2006.01)
*F01P 7/04*  (2006.01)

(52) U.S. Cl.
CPC .............. *F01P 7/167* (2013.01); *F01P 7/04* (2013.01); *G05D 23/1919* (2013.01); *F01P 2025/06* (2013.01); *F01P 2025/30* (2013.01)

(58) Field of Classification Search
CPC ........ F01P 3/00; F01P 3/12; F01P 3/20; F01P 7/16; F01P 7/167; F01P 7/00; F01P 7/14; F01P 11/00; F01P 11/04; F01P 11/14; F01P 11/16; F01P 11/20; F01P 2025/30; F01P 2050/22; F01P 2007/146; G05D 23/1921; G05D 23/1917

USPC ......................................................... 123/41.1
See application file for complete search history.

(56) References Cited

U.S. PATENT DOCUMENTS

| | | | | |
|---|---|---|---|---|
| 4,108,127 A * | 8/1978 | Chapin | .................. | F02D 11/10 123/327 |
| 5,799,625 A * | 9/1998 | Ziolek | ..................... | F01P 7/167 123/41.1 |
| 6,837,217 B1 * | 1/2005 | Hoshino | ............... | F02D 11/105 123/399 |
| 7,082,903 B2 * | 8/2006 | Hutchins | .................... | F01P 7/16 123/41.05 |
| 7,320,434 B2 * | 1/2008 | Suda | ....................... | F01P 7/167 123/41.02 |
| 7,614,368 B2 * | 11/2009 | Gehres | ...................... | F01P 7/16 123/41.08 |
| 8,875,561 B2 * | 11/2014 | Worden | .................... | F01P 11/18 73/40 |
| 8,925,514 B2 * | 1/2015 | Bowman | ................. | F01P 7/164 123/142.5 E |
| 9,151,695 B2 * | 10/2015 | Worden | .................. | F01P 11/18 |
| 2005/0092295 A1 * | 5/2005 | Hoshino | ............... | F02D 11/105 123/399 |

* cited by examiner

*Primary Examiner* — Grant Moubry (57) ABSTRACT

A thermal controller for automotive applications. A thermal controller in an aspect of the present disclosure includes a valve, a motor coupled to the valve, a temperature sensor, flow rate sensor, heater/cooler element, and a controller, coupled to the temperature sensor, flow rate sensor and the motor, in which the controller alters volume and temperature of fluid flow through the valve by turning the motor based on inputs from the temperature sensor.

10 Claims, 5 Drawing Sheets

THERMAL CONTROLLER WITH AUTOMOTIVE APPLICATIONS

CROSS-REFERENCE TO RELATED APPLICATION

This application claims the benefit under 35 U.S.C. § 119(e) to U.S. Provisional Patent Application No. 61/925,199, entitled "THERMAL CONTROLLER WITH AUTOMOTIVE APPLICATIONS," filed on Jan. 8, 2014, the disclosure of which is expressly incorporated by reference herein in its entirety.

BACKGROUND

1. Field of the Disclosure

The present disclosure is related to cooling systems, and, in particular, to automotive engine cooling systems.

2. Description of the Related Art

Typically, engines are either liquid-cooled or air-cooled. For air-cooled engines, the surface of the engine subjected to heating has air flow over a large area to remove the heat via convective/conductive transfer.

In a liquid-cooled engine, similar convective/conductive transfer takes place, typically via the liquid receiving the heat and then being moved, pumped, or otherwise transferred to a radiator or heat exchanger to release the engine heat to the surrounding atmosphere.

Most liquid-cooled engines control this heat exchange via a thermostat, which allows a "cold" engine, i.e., an engine that has not reached operating temperature, to allow a portion of the coolant to remain in contact with the heat transfer surfaces for a longer period of time, and, then when the engine/coolant reaches a certain temperature, the thermostat allows that liquid to be transferred to the heat exchanger and new liquid to contact the engine heat transfer surfaces. This allows the engine to reach operational temperature more rapidly.

A typical thermostat in an automotive engine is a bi-metal device that is closed until the bi-metal switch reaches a certain operational temperature, e.g., 185 degrees Fahrenheit, and once the operational temperature is reached, the thermostat opens and allows coolant to flow through the engine. The thermostat is typically placed between the engine and the automobile's heat exchanger, i.e., the radiator, and coolant is pumped from radiator to engine in a closed system to allow for engine cooling. Thermostats are typically either open or closed, depending on whether the bi-metal "opening" temperature has been reached to open the thermostat, and whether the "closing" temperature has been reached to close the thermostat. The range of operation of a typical thermostat is 10 degrees Fahrenheit, and once the temperature of the coolant is above that range, no control of coolant or engine temperature is possible.

As automobile engines are subjected to various external environments, such as winter weather that may be well below freezing and desert heat that may be well above 100 degrees Fahrenheit, a typical automobile thermostat is not able to distinguish between such extremes nor able to adjust to varying driving conditions, such as mountainous terrain or freeway driving. Further, a typical automobile thermostat cannot adjust for various engine intricacies such as individual engine peculiarities. Further, present day automotive thermostats do not allow for adjustment for fuel economy or increased performance of a given automobile without stopping the engine and removing the thermostat and replacing the thermostat with one that activates at a different temperature. The thermostat also represents a thermal single point failure in most engines. Potential solutions include, but are not limited to, removing the thermostat, installing water restrictor discs, and drilling bypass holes within the thermostat housing.

It can be seen, then, that there is a need in the art for a variable thermal control system. It can also be seen that there is a need in the art for a thermal control system that allows for changing the thermal control of a system during operation.

SUMMARY

The present disclosure describes various aspects of an apparatus and methods for controlling water flow by controlling valve or gate openings, utilizing a unidirectional motor pump with variable flow rate, or controlling a butterfly valve opening to regulate coolant temperature. An electronics module controls the rate of coolant flow by digitizing and reading the coolant temperature sensor and adjusting the appropriate flow of coolant to stabilize the temperature within a user defined or a predetermined range. The present disclosure is useful in automobile engine temperature control to allow engines to operate at optimum temperatures and to prevent against engine overheating.

An aspect of the present disclosure is an adjustable or programmable fluid control device that allows the operator to control cooling by adjusting the opening and closing characteristics of the valve while monitoring the fluid temperature.

A thermal controller in accordance with one or more aspects of the present disclosure comprises a valve, a motor coupled to the valve, a temperature sensor, and a controller, coupled to the temperature sensor and the motor, in which the controller alters a volume of a fluid flow through the valve by turning the motor based on inputs from the temperature sensor and flow rate sensor.

Such a thermal controller further optionally includes a fan, coupled to the controller, in which the controller alters the temperature of the fluid flow by selectively energizing the fan, an input device, coupled to the controller, in which the input device provides at least one input to the controller to control the volume of the fluid flow, where at least one input is a temperature, a mileage achievement, and/or a performance achievement.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Overview

Figure 1:
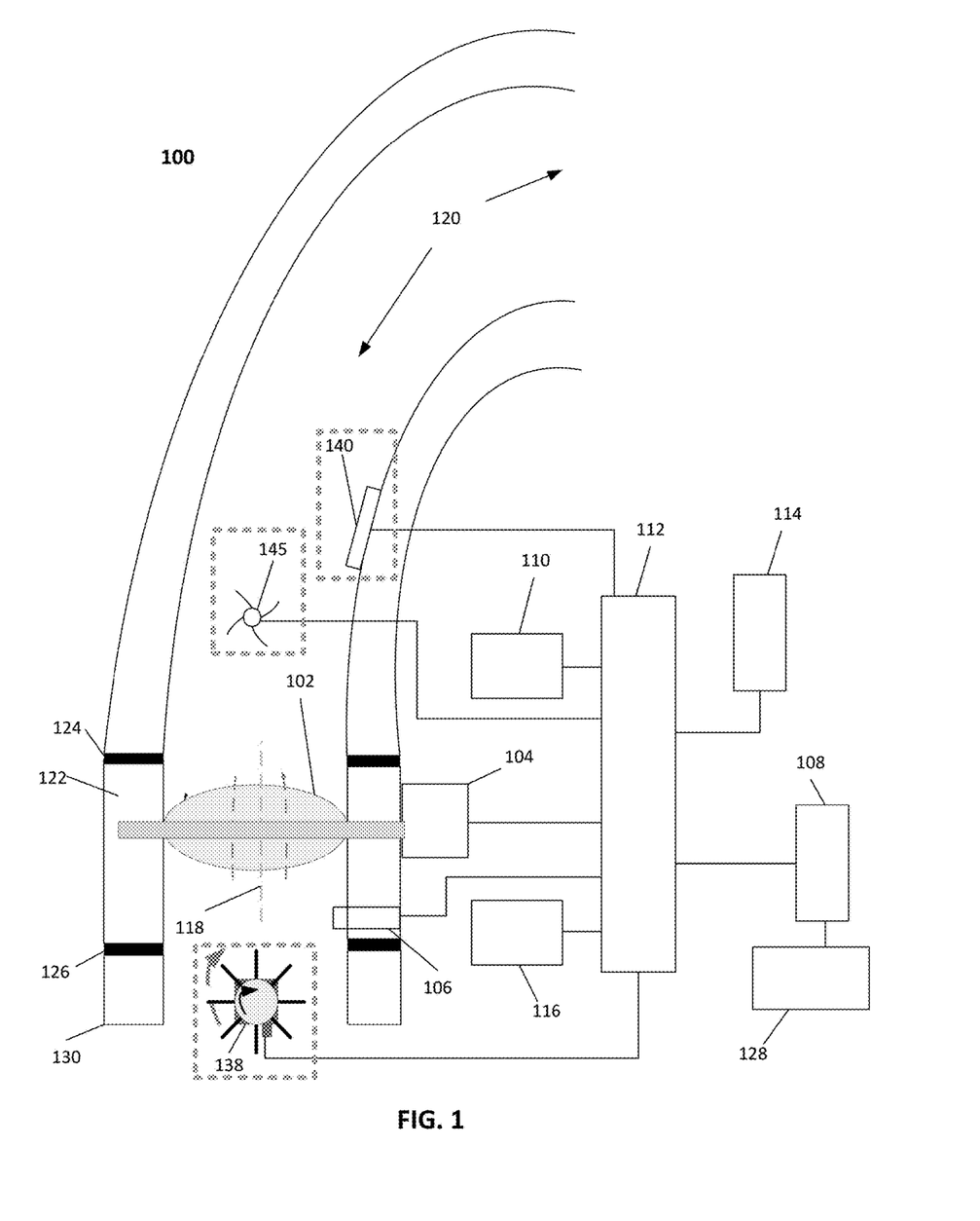
FIG. 1 illustrates a thermal controller in an aspect of the present disclosure.

FIG. 1 illustrates a thermal controller in an aspect of the present disclosure.

A first aspect of a thermal controller 100 of the present disclosure comprises a valve 102, a motor 104, a temperature sensor 106, controller 108, a fan 110, an interface 112, and an input device 114. The thermal controller 100 may also include a thermostat switch 116. Additional/optional interfaces include the flow rate compensation pump 138, Heater/Cooler element 140 and flow rate sensor 145.

The controller 108, which may be a special purpose controller or may be part of a larger system controller or central processing unit, provides signals and/or receives signals from various portions of the thermal controller 100. The controller 108, through the interface 112, controls the motor 104 which turns valve 102 to change the fluid flow rate 118 through a cooling channel 120. The flow rate sensor 145 provides the rate of flow telemetry to the controller 108 for processing. Traditional engine water pumps flow rates are dependent on engine rpm. A flow rate compensation pump 138 may be needed to address applications, where a second pump works in conjunction with the engine water pump, to regulate the flow of fluid providing a constant flow rate, independent of changes in engine rpm. The compensation pump can also be used to adjust the cooling profile of the system for fuel economy and or performance. The temperature sensor 106 sends signals to the controller 108 as a feedback loop to adjust the valve 102. Inputs received from the input device 114, or pre-programmed values that are stored or otherwise available to the controller 108, increase or decrease the flow through the cooling channel 120. Additional controls from the controller 108 may engage the fan 110 to further cool or stop cooling of the fluid, based at least in part on the temperature sensor 106 inputs and the controller 108 desired temperature set point. The heater/cooler element 140 provides the capability to heat up or cool down the fluid. Potential examples for heater/cooler element 140 include, but are not limited to, Thermo Electric Coolers (TEC) or equivalent thermal management system. The external environment will determine capability needed to address initial and operational conditions. For example during a cold winter environment the heater capability is needed while in hot environments the cooler capability is needed. The capability can also be used to assist in either cooling or heating fluid in the system by the controller 108.

The input device 114 may also comprise a controller, as well as user-input buttons or interfaces, to allow a user to input a desired temperature into the thermal controller 100. Furthermore, the input device 114 may also be used to select a desired mileage-per-gallon (or distance-per-volume of fuel) performance for the motor or engine coupled to the thermal controller 100. This manual operation will allow the controller 108 to calculate the temperature which may best achieve that mileage-per-gallon performance. For example, and not by way of limitation, a user may put in that they wish to achieve a 40 MPG average for their automobile, and the controller 108 will adjust the temperature of the fluid in the cooling channel 120 to best achieve the user's desired mileage-per-gallon.

Other inputs that are possible for the input device 114, and/or may otherwise be taken into account by the controller 108, are specific coolant temperatures, acceleration desires (a user may wish to accelerate at a certain maximum value to conserve fuel), an external temperature (the automobile may be operated in the desert or in winter time differently than in a more temperate condition), an override (to disable the controller 108 or to avoid failure of the thermal controller 100), or other conditions that may affect the temperature of the fluid in the cooling channel 120, which, in turn affects the operation of an engine coupled to the thermal controller 100.

Other types of inputs are possible for the controller 108 to take into account. For example, and not by way of limitation, other controllers or devices, or other user inputs via the input device 114, may provide inputs to the controller 108, which may alter or change the temperature and/or fluid flow rate in the cooling channel 120. The heater/cooler element 140 controls/adjusts the fluid temperature. The flow rate compensation pump 138 controls the fluid flow profile. The flow rate sensor 145 monitors the fluid flow rate. Inputs related to pollution controls or limitations, road conditions, tire pressure, shock absorber pressure, or other performance/fuel economy related inputs may be provided to the controller 108 to change and/or adjust the temperature and/or flow rate of the fluid in the cooling channel 120.

Although shown as a butterfly valve 102, which rotates out of the plane of the fluid flow, other valves, such as iris valves, ball valves, etc., may be used with respect to the present disclosure.

The operational scenario may be as follows: (a) achieve an optimum initial temperature profile in a specified time then (b) maintain optimum temperature profile based on fuel economy and/or performance. During the (a) initial temperature scenario the following may apply for Cold, Hot and ambient environments. In cold environments, for example, winter in Alaska, the heater/cooler element 140 may be energized in heater mode to heat up the fluid to aid in achieving an optimum temperature in a minimum time period. In hot environments, for example, summer in Arizona, the heater/cooler element 140 may be energized in cooler mode to cool down the fluid to aid in achieving an optimum temperature in a minimum time period. In an ambient temperature environment the heater/cooler element 140 may be disabled because it may not be needed in achieving an optimum temperature in a minimum time period. In Cold, Heat and ambient modes the flow rate compensation pump 138, in conjunction with a traditional engine water pump, provides for constant fluid flow rate to control the thermal profile. During the (b) maintenance mode the objective is to maintain an economy temperature profile sub-mode and/or a performance temperature profile sub-mode. Fuel economy sub-mode can be achieved by monitoring temperature sensors 106 and flow rate sensor 145 and adjusting the butterfly valve 102, the flow rate compensation pump 138 and heater/cooler element 140 as part of the servo loop to maintain fuel economy mode. The performance sub-mode is similar to the economy sub-mode with a performance servo optimized for performance. In performance-economy sub-mode the objective may account for a different thermal profile. In fuel economy mode, the temperature profile may be constant, variations in temperature ($\Delta T$) set points could be emissions related; for example, California emission standards maybe different from Washington and may involve a tighter thermal control loop. The performance mode could vary to satisfy the demands of high performance street, strip or track. Thermal loops set points may vary due to track conditions and race specifications. For example, on a race track, the yellow flag performance may not be the same as green flag performance. For yellow flag performance fuel economy and cooling, the engine with restrictive air are very important metrics. During green flag performance, keeping temperatures at optimum temperatures while the engine is experiencing variations in engine loads and air flow variations to the radiator. An example is cooling requirements for NASCAR during the draft where air flow to the radiator may be decreased, enabling an auxiliary cooler or heater/cooler element 140 as a cooler could allow performance to be maintained where radiator cooling may be insufficient.

As shown in FIG. 1, the valve 102 may be located in a housing 122, with optional gaskets 124 and 126, such that housing 122 may be placed anywhere in the cooling channel 120. As such, the thermal controller 100 of the present disclosure may be retrofitted in automobiles or other engines that were not initially designed for use with the thermal controller 100. Further, the thermal controller 100 may also be incorporated into a new design which may be less expensive to build and/or install, or be mounted directly to an engine block 130 if desired.

Further, the valve 102 may have vanes, such as those on a paddlewheel boat or turbine (screw), to drive the fluid in the cooling channel 120. The fan 110 may also be used as additional cooling for the fluid. As additional cooling fluid flows through the channel, and is further cooled by the fan 110, lower temperatures for the cooling fluid may be possible, and, as such, more efficient engine use, faster acceleration, or other performance adjustments may be possible.

The motor 104 may be a stepper motor, but may also be any other type of motor that is compatible with the valve 102 and the controller 108/interface 112.

As the temperature sensor 106 senses the temperature of the liquid in the cooling channel 120, the controller 108 determines whether to increase or decrease the flow of cooling fluid through the cooling channel 120 based on the inputs from the input device 114 or from pre-programmed values known to the controller 108. The controller 108 may store default values internally, or access default values from a memory 128, or receive values from the input device 114.

Because the controller 108 may receive input from the memory 128, the input device 114, or from internal or other external sources, only one set of inputs is active at a given time. In "manual mode" the controller 108 receives inputs from the input device 114, which provides the motor 104 inputs received from a user without regard to temperature, fan usage, or other inputs that the controller 108 would use to determine the flow of coolant through the cooling channel 120.

In "automatic mode" the user may set a coolant temperature set point, e.g., 175 degrees Fahrenheit (which may be input directly on the input device 114), thus allowing the controller 108 to automatically determine the fluid flow and control the coolant flow through the channel to maintain the coolant temperature (measured by the temperature sensor 106) set by the user. Additional parameters the user or controller could implement are temperature ranges for example 180 F-200 F or 190 F+/−10 F, where potentially 180 F may be performance mode, 190 F may be economy-performance and 200 F may be economy mode. Having these controls including set points available may allow the user to dial-in several deterministic set points to perform some testing and determine the miles per gallon for fuel economy testing. Tabulating the results could determine optimum set points.

Due to the variations in engine designs, proper cooling challenges may involve incorporating controlled cooling channels for each cylinder due to temperature variation between each cylinder designs and location. Examples include head or cylinder relationship to exhaust manifolds, which could cause certain cylinders to be hotter than others. Solutions my involve adapting the system to monitor multiple cylinders with multiple thermostats and flow valves to allow increased flow the cylinders which need additional cooling. The ability to control the temperature based on multiple sensors, either as an average or as the "hottest" sensor being the overriding sensor to the controller could be incorporated within the scope of the controller. In "remote mode" the input device allows other external controllers (e.g., wireless resetting of the controller 108 default values) to operate the controller 108 and the thermal controller 100 in either manual or automatic mode.

The construction details of the disclosure of FIG. 1 are that the thermal controller 100 may be made of a variety of materials that are sufficiently rigid and strong materials such as high-strength plastics, metals, and the like. Furthermore, the various components of the thermal controller 100 can be made from different materials based on the desires of the designer and the applications envisioned for the thermal controller of the present disclosure.

Since conventional engine thermostats are either open or closed, and operate with a fixed opening temperature and a fixed closing temperature, the present disclosure allows for finer control of the temperature of the coolant in the cooling channel 120, and the ability to change the operating temperature in near-real-time. This allows for the customization of engine temperature to meet specific goals including performance, fuel economy and adaptability.

Potential additional applications of the present disclosure include tailoring emissions and gas mileage in populated areas and national parks, increasing efficiency and gas mileage during commuter highway travels, and increasing engine performance on hilly or other terrain. Potential scenarios including artificial intelligence provide the tools for learning the external environment based on geographic and GPS telemetry, allowing the ability to optimize efficiency, emissions and performance to comply with local emissions standards and terrain. Additional benefits of artificial intelligence is the ability to provide a better operating point for an individual engine/motor, and the data from multiple motors will provide better operating points for engines/motors in general.

Input Control

Figure 2:
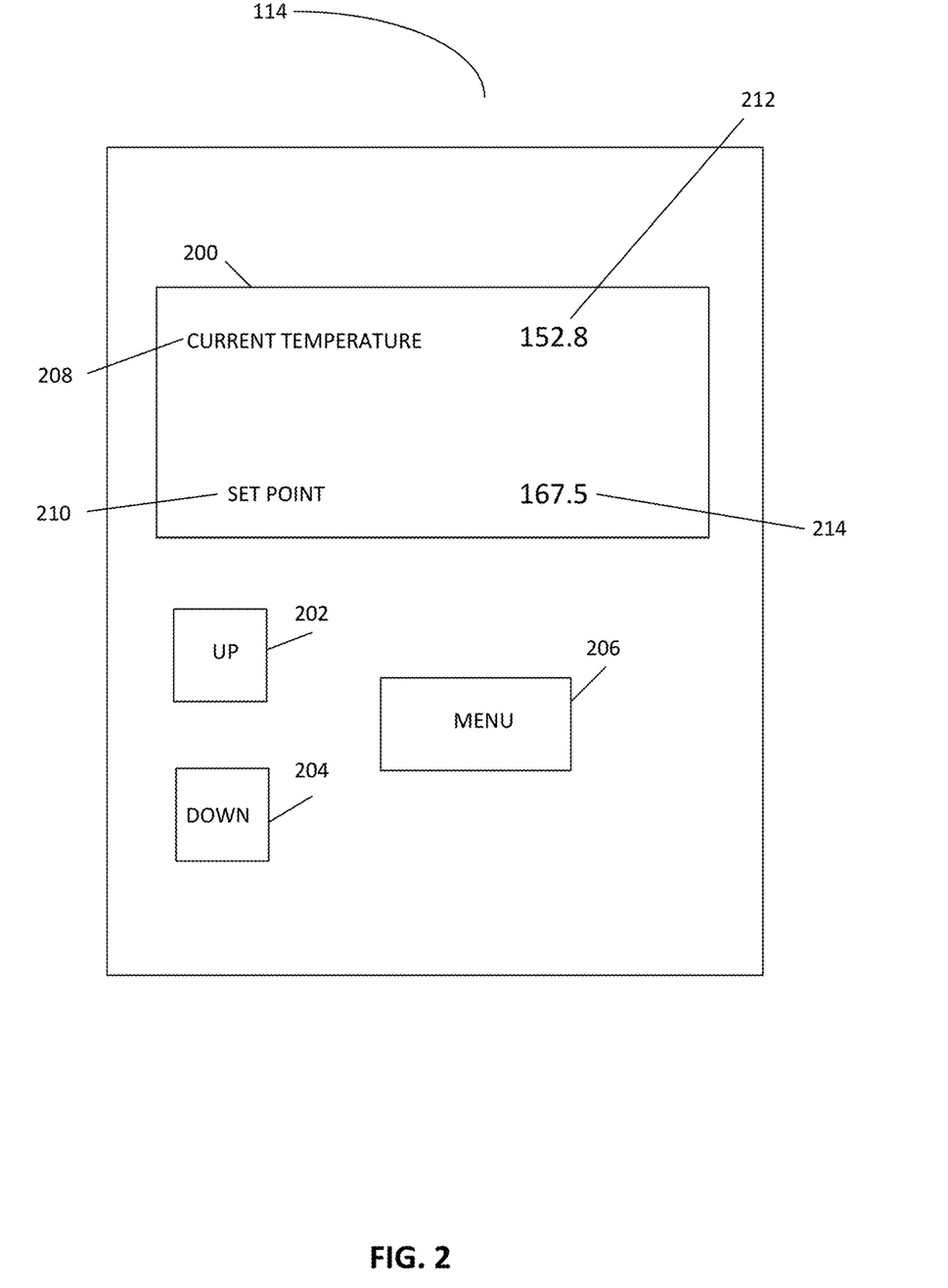
FIG. 2 illustrates an input device in accordance with an aspect of the present disclosure.

FIG. 2 illustrates an input device 114 in accordance with an aspect of the present disclosure.

The input device 114 may contain, inter alia, a display 200, an up button 202, a down button 204, and a menu button 206. The input device 114 may contain more than one display 200, and may contain other input devices such as switches, toggles, or other input devices, such as a touch screen, to perform the functions described herein with respect to the components of the input device 114.

The display 200 may illustrate, either with text 208 and text 210, or with colors, sounds, or other data that may be noticed or otherwise sensed by a user or by the controller 108, or by other inputs to the controller 108, the variables and controllable inputs for the thermal controller 100. As shown in FIG. 2, the text 208 reads "current temperature,"

which may be the temperature sensed by the temperature sensor 106. The text 208 may display other items, such as a modified temperature, because of errors or other calibrations in the thermal controller 100, an outside temperature, a flow rate, a mileage-per-gallon achievement, an exhaust temperature, an exhaust chemical analysis (e.g., CO parts-per-million value), or other variable that the user inputs to the controller 108 or inputs the controller 108 otherwise receives. The text 208 may also read "default settings" or other starting parameters for the controller 108.

The text 210 may read "set point" or other user input value, which indicates that this is the variable that the user or the controller 108 may be controlling. In FIG. 2, the current value 212 is shown as 152.8 degrees Fahrenheit and set point value is shown as value 214, which is 167.5 degrees Fahrenheit. The values 212 and 214 may include the units on the display 200 as desired, although not shown. Further, the values 212 and 214 may be in metric units, English units, or other units as desired.

The up button 202 and the down button 204 may be used to control the value 214. Other input approaches, such as having preset buttons or preset values for each of the input variables may be used without departing from the scope of the present disclosure. The menu button 206 allows the user to change the display 200 to other variables that may be input by the user via the input device 114. Further, the menu button 206 allows for additional control of the thermal controller, e.g., resetting standard values, registering data acquired by the controller for various combinations of variables, etc., to allow the user or the controller 108 (FIG. 1) to "learn" which variable or combination of variables provides specific performance desires.

For example, and not by way of limitation, a default temperature set point for the thermal controller 100 may be 175 degrees Fahrenheit when the outside temperature is 70 degrees Fahrenheit. However, the controller 108, or the user, or another sensor such as a thermometer within the automobile, whether or not coupled to another controller, may input a different and/or actual temperature to the controller 108. For example, and not by way of limitation, the thermometer display in many automobile interiors may indicate that the outside temperature is 20 degrees Fahrenheit, and this temperature may be input to the controller 108 which may adjust the set point temperature to 180 degrees Fahrenheit.

The controller 108, or another controller, may then record data from the remainder of the system, e.g., the automobile computer, the automobile Electronic Control Unit, Global Positioning System data, etc., to determine the performance characteristics of the automobile with an outside temperature of 20 degrees Fahrenheit and an operating set point of 180 degrees Fahrenheit. The acceleration, fuel mileage, handling, power delivered to the wheels, and/or other data may be recorded.

The controller 108 may also record data, or have recorded data as default values from testing or other sources, of the performance of the automobile engine at 20 degrees Fahrenheit outside temperature at a set point temperature of 175 Fahrenheit degrees. The controller 108, or the user, may then compare the results of mileage, handling, power, etc. for the two sets of input conditions. Should one set of input variables deliver better performance in one or more areas, those data points can be stored or otherwise noted by controller 108, and/or by the user, for future operation of the thermal controller 100 within the automobile or other system containing the thermal controller 100.

Although the controller 108 is envisioned as operating on digital data, analog data from one or more sensors, as well as reporting analog data to one or more devices within the thermal controller 100, is envisioned as within the scope of the present disclosure.

The up button 202 and the down button 204 (FIG. 2) may also be used to directly control the valve 102 (FIG. 1), as well as directly control other devices within the thermal controller 100, such as the fan 110. Further, the input device 114 may be integrated into other devices, such as the automobile's audio system, climate control system, or other systems that are accessible to drivers and/or passengers.

Further, the display 200 may display other values or variables to be selected or emphasized by the controller 108. For example, and not by way of limitation, the controller may be given a preferred variable which would be maintained by the controller 108 at the expense of other variables. One user may prefer to maximize or increase fuel efficiency, while another user may prefer to maximize or emphasize performance. As such, each user may select from several variables and how much emphasis should be placed on each variable that the controller 108 takes into account when determining the operation of valve 102 or the flow rate of the fluid in the cooling channel 120 as sensed by flow rate sensor 145.

Some variables may not be accessible to the user as related to emphasis or variability in determining the operating point of the controller 108. For example, and not by way of limitation, exhaust gas composition may be mandated by federal and/or state law. Allowing a user to modify the controller 108 with respect to pollution controls might violate such laws. In such cases, the thermal controller 100 may have limits or other restrictions on access to such inputs. Further, regardless of other inputs to the controller 108, some variables, such as pollution controls, may override any user and/or other inputs to the controller 108 if desired.

As previously discussed, the valve 102 may also be a motor with vanes that force coolant flow through the cooling channel 120. In such an aspect of the present disclosure, a mechanical thermostat gate may be required to control the fluid flow in the cooling channel 120. In such an aspect, the up button 202 and down button 204 (FIG. 2), as well as the input device 114 (FIG. 1), may directly control the speed of the motor that is included in the valve 102. Other text 210 and 208 (FIG. 2) may be needed to display this direct control.

Colors on the display 200 may also be included to indicate to the user that certain conditions exist. For example, and not by way of limitation, when the set point and the current temperature are relatively equal, a common color for both of the values 212 and 214 may exist on the display 200. However, when the set point and the current temperature differ by more than a few degrees, or a certain percentage, the colors for the values 212 and 214 may be different. Further, emergency conditions, or override conditions, may also be displayed by a specific color, which may be red, or approaching dangerous conditions may be displayed by another specific color. Achievement of user or controller 108 values, such as mileage, may also be indicated on the display 200.

Other conditions may also be displayed on the display 200. For example, inputs to the controller 108 that may be unachievable by the thermal controller 100, e.g., a temperature that is too high for the thermal controller 100, a miles-per-gallon figure that is too high or low, a performance figure that would require too high of a temperature, can be highlighted or displayed to the user as improper. Further, as the thermal controller gathers additional data on actual performance, such conditions may later be considered as possible, and included in the possible input values for the thermal controller 100. In such cases, as well as other cases, the range of possible conditions may expand or contract based on the actual performance of the thermal controller 100 in a given vehicle.

A global perspective for vehicles of certain models, types, or engine displacement, or other chosen parameters may also be obtained by comparing data stored by the thermal controller 100 in one vehicle to data recorded/stored by the thermal controllers 100 in other vehicles. Trends and updates to performance values can be transferred from one thermal controller 100 to another to determine if changes to some inputs may result in better performance, better gas mileage, or more accurate acquisition of target temperatures/flow rates. These may be more easily achievable using a broader range of inputs from multiple vehicles.

In another aspect, the thermal controller 100 may "learn" how to adjust the temperature/flow rate from a cold start to a desired operating point by recording data during engine warm-up periods and analyzing the engine response. For example, and not by way of limitation, if the outside temperature is 90 degrees Fahrenheit, the thermal controller 100 may open valve 102 immediately upon starting the engine rather than waiting until the fluid reaches a certain set-point temperature. Such actions may slow down achievement of the set-point temperature, but may result in overall performance and/or fuel efficiency metrics. The thermal controller 100 may also close valve 102 sooner than indicated by the set-point temperature, based on the inputs and/or emphasis provided by the user and/or controller 108. Such alternative operating methods may also be recorded and tested against pre-programmed values to allow the thermal controller 100 to operate more efficiently.

Process Flow

Figure 3:
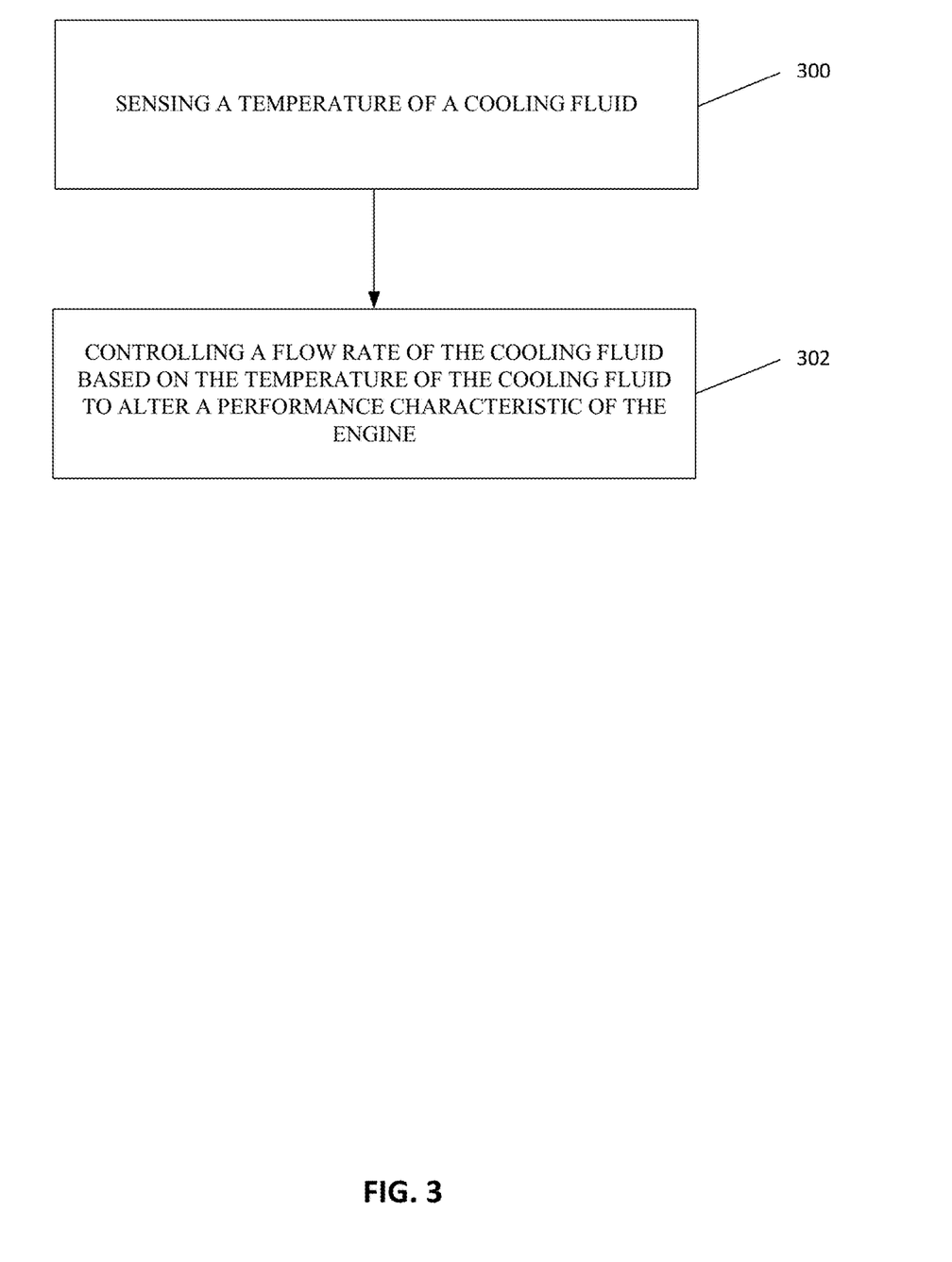
FIG. 3 illustrates a process flow in accordance with an aspect of the present disclosure.

FIG. 3 illustrates a process flow in accordance with an aspect of the present disclosure.

Block 300 illustrates sensing a temperature of a cooling fluid. Block 302 illustrates controlling a flow rate of the cooling fluid based on the temperature of the cooling fluid to alter a performance characteristic of the engine.

Butterfly Valve Housing Assembly

Figure 4:
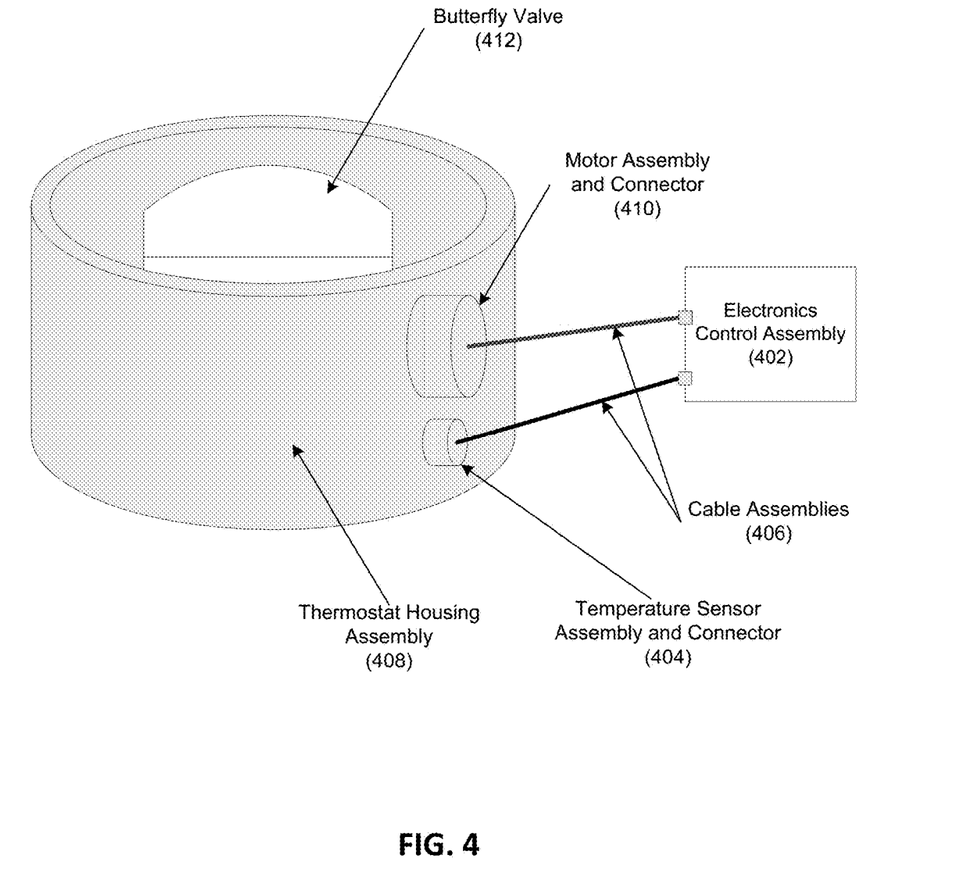
FIG. 4 illustrates a mechanical housing assembly for the butterfly valve, motor assembly and temperature sensor, associated with an aspect of the present disclosure.

FIG. 4 illustrates the mechanical housing components in accordance with an aspect of the present disclosure.

The mechanical housing assembly 408 contains the butterfly valve 412, motor assembly 410, and temperature sensor 404, associated with the electronics control unit 402. The assembly 408 is referred to in FIG. 1 as housing 122, where butterfly valve 412 is referred to in FIG. 1 as valve 102.

Figure 5:
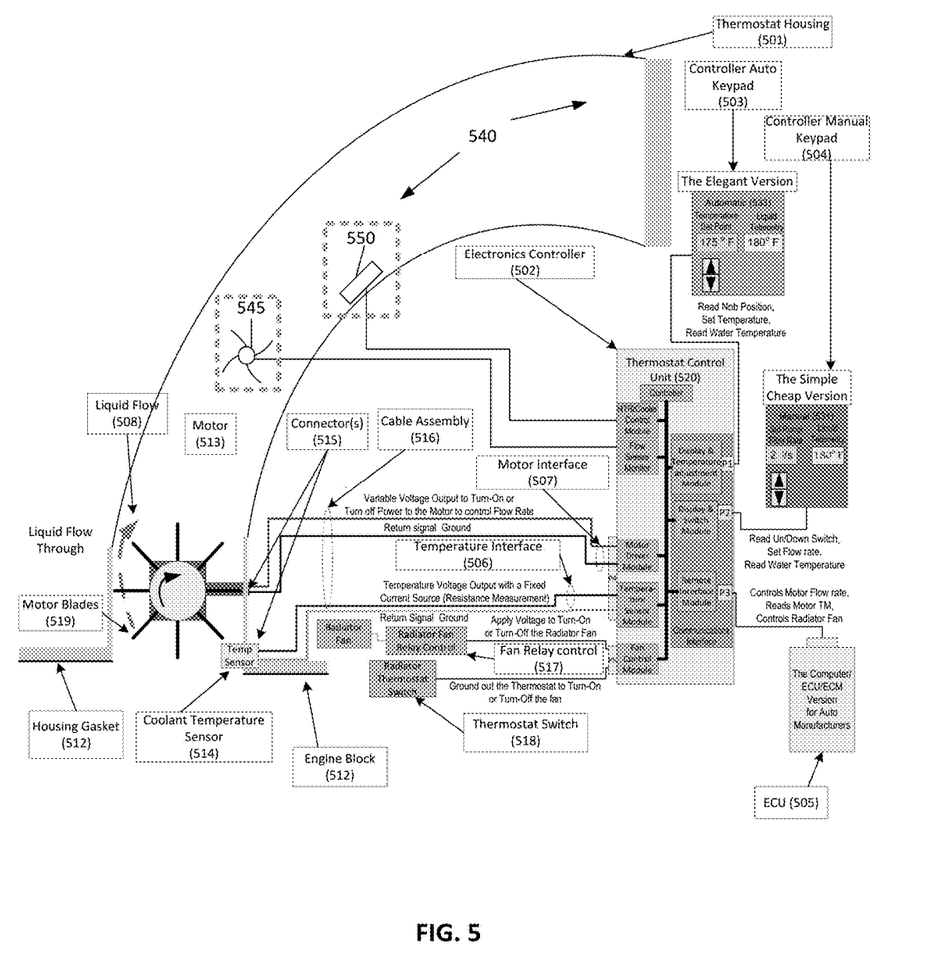
FIG. 5 illustrates a motor controlled fluid flow or paddlewheel implementation with detailed electrical architecture block diagram in an aspect of the present disclosure.

FIG. 5 illustrates the motor controlled fluid flow 513 or a variable flow rate motor assembly or paddlewheel implementation with detailed electrical architecture block diagram in an aspect of the present disclosure. FIG. 5 represents a different implementation of fluid flow control within the present disclosure by decreasing part count, eliminating the butterfly valve.

As the temperature sensor 514 senses the temperature and flow rate sensor 545 senses the liquid flow in the cooling channel 540, the controller 502 determines whether to increase or decrease the flow of cooling fluid through the cooling channel 540 based on the inputs from the input device 501. Manual Controller 531 and Auto Controller 533 or from pre-programmed controller 505.

The variable flow rate motor assembly 513 is controlled similarly to the flow rate compensation pump 138/illustrated in FIG. 1. The variable flow rate motor assembly 513 incorporates the function of engine water pump and flow rate compensation pump 138 as illustrated in FIG. 1. The advantage is the elimination of the engine water pump and the ability to accelerate/decelerate the fluid flow faster than a traditional water pump controlled by engine speed. Such a pump may achieve the set point faster and allow for less hysteresis in the system, and/or allow for changes that are unrelated to engine speed. This control loop is less complex that the control loop involving engine water pump and flow rate compensation pump 138 as described in FIG. 1. The electronics is similar to the illustration in FIG. 1. Differences between FIG. 5 and FIG. 1 are that the motor assembly 513 controls the flow of liquid varying the rotational speed of the motor, while the motor 104 in FIG. 1 controls the butterfly valve opening, while using a traditional mechanical water pump driven by engine RPM or an electric water pump with a variable water flow 138. Additional differences include a thermostat housing 408 (FIG. 4) for the butterfly valve only while FIG. 5 does not include this as a separate housing. The housing may become part of the water pump assembly. The Temperature sensor 514 is also part of the motor assembly. The differences in motor characteristics will tailor the motor drive electronics in FIG. 1 and FIG. 5. Additional/optional interfaces include, similar to FIG. 1, the Heater/Cooler element 550 and flow rate sensor 545, in FIG. 5.

Conclusion

Those of skill would further appreciate that the various illustrative logical blocks, modules, circuits, and algorithm steps described in connection with the disclosure herein may be implemented as electronic hardware, computer firmware, computer software, or combinations of all of the above. To clearly illustrate this interchangeability of hardware and software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, in firmware or in a combination of all three. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM, flash drives, or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, Bluetooth, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, this disclosure is not intended to be limited to the examples and designs described herein, but is to be accorded the widest scope consistent with the principles and novel features disclosed herein.

What is claimed is:

1. A thermal controller for an engine, comprising:
    a valve,
    a motor coupled to the valve;
    a temperature sensor;
    a controller, coupled to the temperature sensor and the motor, in which the controller alters a volume of a fluid flow through the valve by turning the motor based on inputs from the temperature sensor; and
    an input device comprising at least a display and a user interface, coupled to the controller, in which the input device is configured to allow user input of at least one preferred performance characteristic of the engine to the controller via the user interface, the user input being shown on the display, such that the user input is an additional input to the controller to adjust the volume of the fluid flow based on the at least one preferred performance characteristic of the engine provided to the input device via the user interface.

2. The thermal controller of claim 1, further comprising a fan, coupled to the controller, in which the controller alters a temperature of the fluid flow by selectively energizing the fan.

3. The thermal controller of claim 1, in which the input device provides at least two preferred performance characteristics to the controller.

4. The thermal controller of claim 3, in which one of the at least two preferred performance characteristics is a temperature.

5. The thermal controller of claim 3, in which one of the at least two preferred performance characteristics is a mileage achievement.

6. The thermal controller of claim 3, in which one of the at least two preferred performance characteristics is a performance achievement.

7. The thermal controller of claim 1, wherein the motor comprises a variable flow rate motor assembly.

8. A method of controlling engine performance, comprising:
    sensing a temperature of a cooling fluid;
    inputting user input to a controller via a user interface of an input device, the user input comprising a performance characteristic of the engine;
    displaying the user input on a display; and
    controlling a flow rate of the cooling fluid based on the temperature of the cooling fluid and the user input to alter the performance characteristic of the engine.

9. The method of claim 8, in which the performance characteristic of the engine is a temperature.

10. The method of claim 8, in which the performance characteristic is a mileage achievement.

* * * * *